US006522735B1

(12) United States Patent
Fortman et al.

(10) Patent No.: US 6,522,735 B1
(45) Date of Patent: Feb. 18, 2003

(54) NETWORK SELECTION SUPPORT IN A COMMUNICATIONS SERVICE BIDDING EXCHANGE

(75) Inventors: Peter A. Fortman, Raleigh, NC (US); Patricia J. Carstensen, Durham, NC (US)

(73) Assignee: Nortel Networks Limited, St. Laurent (CA)

( * ) Notice: Subject to any disclaimer, the term of this patent is extended or adjusted under 35 U.S.C. 154(b) by 150 days.

(21) Appl. No.: 09/685,279

(22) Filed: Oct. 10, 2000

(51) Int. Cl.[7] .............................................. H04M 15/00
(52) U.S. Cl. ............................ 379/115.01; 379/114.01; 379/114.02; 379/114.03; 379/114.28; 379/121.01
(58) Field of Search ........................... 379/111, 112.01, 379/112.02, 112.07, 114.01, 114.02, 114.03, 114.05, 114.06, 114.07, 114.1, 114.12, 114.28, 115.01, 121.01, 221.02; 705/10, 37

(56) References Cited

U.S. PATENT DOCUMENTS

| | | | |
|---|---|---|---|
| 4,831,649 A | | 5/1989 | Mejane ........................ 379/111 |
| 5,163,042 A | | 11/1992 | Ochiai ......................... 370/17 |
| 5,185,785 A | | 2/1993 | Funk et al. .................. 379/111 |
| 5,420,914 A | | 5/1995 | Blumhardt .................. 379/114 |
| 5,425,084 A | | 6/1995 | Briskele ...................... 379/112 |
| 5,508,999 A | | 4/1996 | Cox, Jr. et al. .............. 370/17 |
| 5,510,405 A | | 4/1996 | Heucher et al. ............. 524/233 |
| 5,553,124 A | | 9/1996 | Brinskele .................... 379/112 |
| 5,606,602 A | * | 2/1997 | Johnson et al. ......... 379/115.01 |
| 5,638,433 A | | 6/1997 | Bubien, Jr. et al. .......... 379/130 |
| 5,781,620 A | | 7/1998 | Montgomery et al. ...... 379/115 |
| 5,790,642 A | | 8/1998 | Taylor et al. ................ 379/112 |
| 5,802,502 A | | 9/1998 | Gell et al. ..................... 705/37 |
| 5,878,121 A | | 3/1999 | Nakanishi .................... 379/115 |
| 5,878,122 A | | 3/1999 | White et al. ................. 379/115 |
| 5,917,897 A | | 6/1999 | Johnson et al. ............. 379/114 |
| 5,995,602 A | * | 11/1999 | Johnson et al. ............. 379/116 |
| 6,005,925 A | | 12/1999 | Johnson et al. ............. 379/112 |
| 6,058,379 A | * | 5/2000 | Odom et al. ................. 705/37 |
| 6,114,727 A | * | 11/2000 | Mashinsky ............. 379/112.01 |
| 6,226,365 B1 | * | 5/2001 | Mashinsky ............. 379/112.01 |
| 6,269,157 B1 | * | 7/2001 | Coyle ..................... 379/114.01 |
| 6,345,090 B1 | * | 2/2002 | Walker et al. ......... 379/114.12 |

OTHER PUBLICATIONS

FitzGerald, Jerry; Alan Dennis: Business Data Communications and Networking, 1999, 6th ed., chapter 8.*
Whatis.com: searchNetworking.com Definitions, http://www/whatis.com/.*

* cited by examiner

Primary Examiner—Curtis Kuntz
Assistant Examiner—Quoc Tran
(74) Attorney, Agent, or Firm—Withrow & Terranova, P.L.L.C.

(57) ABSTRACT

A network building system uses criteria from a potential buyer of network services operating in a communications service bidding exchange to identify one or more network segments meeting the buyer's criteria. The exchange allows buyers to purchase usage privileges on network segments operated by service providers affiliated with the exchange. A number of geographically disperse hubs affiliated with the exchange are interconnected by these network segments. Multiple network segments from different providers may interconnect any two hubs. Thus, a challenge arises when a buyer requires network services that involve multiple hubs because of the potential number of network segments involved and the range of choices for selecting a specific set of network segments meeting the buyer's needs. The network building system uses buyer criteria to identify network segments, or combinations of segments, meeting the buyer's needs. Network segment selection functions may be automatic or interactive, at the buyer's discretion.

39 Claims, 7 Drawing Sheets

NETWORK SELECTION SUPPORT IN A COMMUNICATIONS SERVICE BIDDING EXCHANGE

FIELD OF THE INVENTION

The present invention relates to communications services bidding exchanges, and particularly relates to facilitating the selection and purchase of communications network services through the bidding exchange.

BACKGROUND OF THE INVENTION

Trading exchanges allow exchange participants to buy and sell goods and services in a competitive marketplace. Typically, sellers of like goods or services compete with each other on price, availability, or other criteria, allowing buyers within the exchange to buy from the seller most closely meeting their needs.

A given trading exchange generally focuses on related types of goods or services, such as commodities (e.g., grain, oil), or equities (e.g., publicly traded stocks). Extending the trading exchange model to other industries can yield cost and service benefits, but oftentimes entails difficulties in terms of enabling efficient and reliable buying and selling when the traded commodity is intangible. For example, as communications systems evolve into distributed, high-bandwidth networks, service providers and their customers have increasingly come to view bandwidth itself as a "commodity." Indeed, there are limited examples of trading exchanges focused on buying and selling communications network services.

However, buying and selling communications services in a trading exchange entails complications commensurate with the complexity of the underlying network systems on which the services offered through the exchange are based. To realize full benefit from the exchange (e.g., lowest cost, best service, etc.), buyers should have an opportunity to consider the full range of possibilities available through the exchange for fulfilling their communications service needs.

Consider a scenario in which a buyer wishes to reserve data carrying capacity between first and second cities over a desired period. Depending upon the communications network facilities affiliated with the exchange, there may be a substantial number of possibilities for interconnecting the first and second city during the desired period. Further complicating the buyer's task, no single service provider operating in the exchange may offer a seamless network connection between the two cities. Thus, the buyer's challenge becomes that of assembling an ad hoc network connection between the first and second cities from a potentially large pool of communications network resources. The ad hoc network connection (path) will oftentimes include multiple network segments from different service providers affiliated with the exchange.

If a communications service trading exchange automated the process of identifying potential network paths assembled from the pool of network resources available through the exchange, buyers operating in the exchange would be relieved of a substantial burden. Ideally, buyers could choose reduced automation such that all or a portion of the ad hoc network could be manually selected, thus preserving buyers' freedom to control the selection process. Further, this automated network building functionality should have the ability to consider multiple buyer criteria, such as cost, performance, and connection topology when selecting network paths for the buyer.

SUMMARY OF THE INVENTION

The network building system of the present invention works within a communications service bidding exchange to aid buyers in identifying and reserving data, bandwidth, or wavelength capacities, among other resources, on network facilities associated with the exchange. The exchange allows buyers to reserve usage privileges on network segments operated by service providers affiliated with the exchange. A number of geographically disperse hubs affiliated with the exchange are interconnected by these network segments. Multiple network segments from different service providers may interconnect any two hubs. When a buyer needs to reserve communications capacity between two or more of the hubs, the network building system assists the buyer in identifying the combination of network segments interconnecting the hubs of interest, including any intervening hubs, that best fulfills their particular criteria. A given combination of network segments interconnecting any of the hubs of interest is termed a "network path." A network path may include one or more individual network segments.

The network building system may operate automatically, operating without buyer interaction to select a combination of network segments (network path) meeting the buyer's criteria. In this mode, the network building system may be transparent to the buyer, with the buyer simply providing their selection criteria to the exchange and receiving a proposed network path in response. Alternatively, the buyer may interact with the network building system to hand pick individual network segments. This manual aspect of operation may be intermingled with automatic selection such that some network segments are hand picked by the buyer and others automatically selected by the network building system. Even with manual operations, the network building system can reduce selection complexity for the buyer by providing the buyer with a reduced set of network segment choices based on the buyer's criteria.

Buyers' criteria may define specific qualifications used by the network building system to identify a suitable network path. These qualifications influence the network segments and supporting hubs selected by the network building system. For example, a buyer may specify a specific data capacity or a type of network segment and provide needed dates for usage. The network building system in this instance might simply select the network path and hubs available during the requested dates that best meet the buyer's specific criteria. However, the network building system also provides enhanced selection functionality by translating broad buyer criteria into specific network path requirements.

For example, the buyer may indicate to the exchange the desire to reserve video data carrying capacity between a given pair of hubs for a given range of dates. In this instance, the network building system may use stored information regarding the particular performance needs of video transmission to select an optimal network path interconnecting suitable hubs relevant to the buyer's needs, such as geographic locations and performance requirements.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The present invention relates to an automatic network building system facilitating the selection of communications resources within a communications services bidding exchange. Reference is now made in detail to the preferred embodiments of the invention, examples of which are illustrated in the accompanying drawings, wherein like numerals indicate the same elements throughout the several views.

Figure 1:
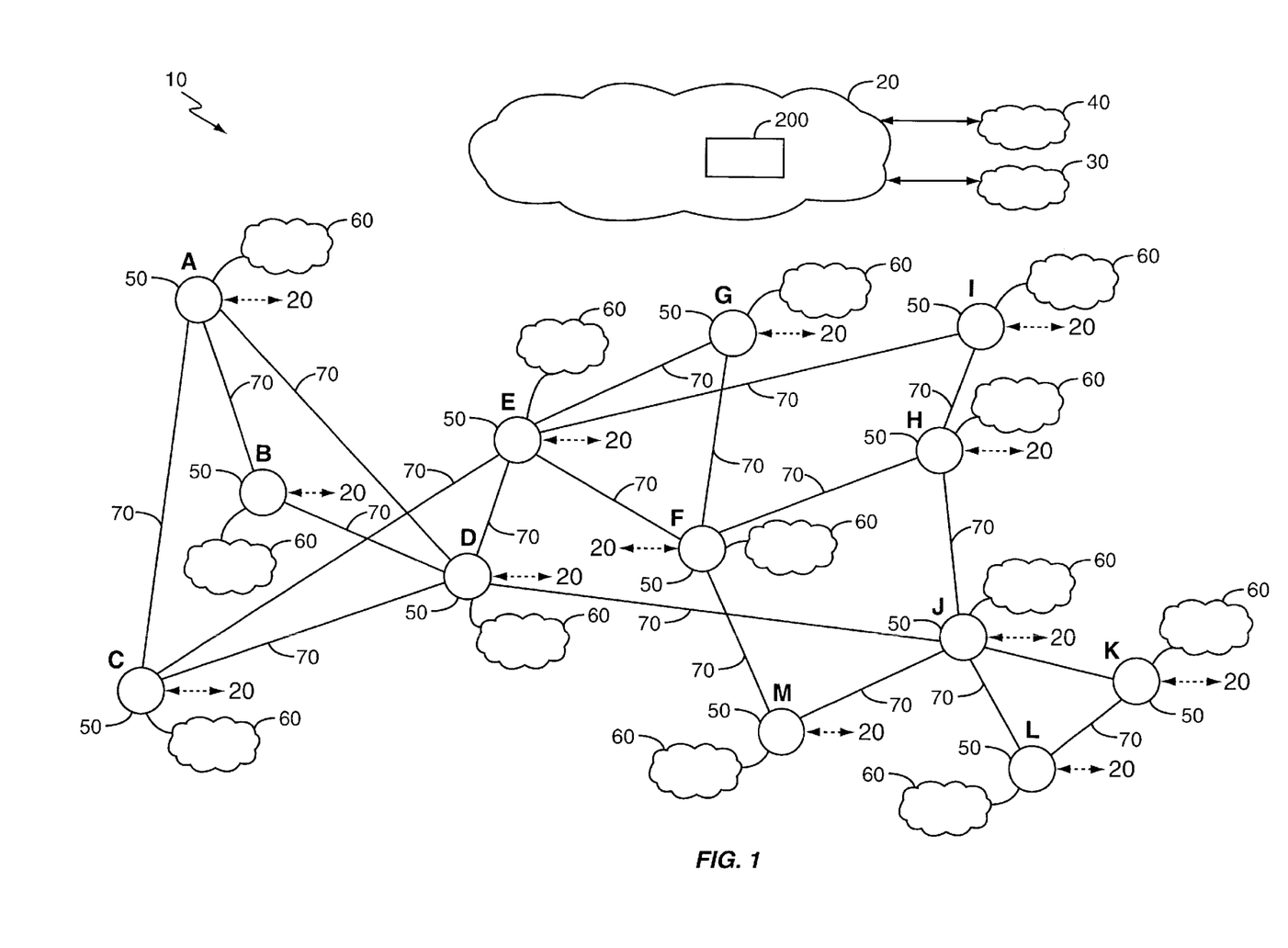
FIG. 1 illustrates an exemplary system for practicing the network building operations associated with the present invention.

FIG. 1 illustrates an exemplary system 10 for practicing one embodiment of the present invention. A communications services bidding exchange 20 provides a trading market allowing buyers 30 and sellers 40 to buy and sell communications services, including long haul data transport. The exchange 20 is associated with a number of hubs 50 that are interconnected in various combinations by network links 70. The network links 70 emanating from or terminating at a given hub 50 may be affiliated with a number of different service providers. The service providers participate in the exchange 20 directly as sellers 40, or may be indirectly represented by various sellers 40 operating within the exchange 20. Customers in the various customer groups 60 have communications equipment interconnected with various ones of the hubs 50. Thus, customers participating directly or indirectly as buyers in the exchange 20 may purchase communications services involving the network links 70 interconnected to the various hubs 50. The exchange 20 communicates directly or indirectly with the various hubs 50 so that each hub 50 can selectively interconnect the facilities of customers in associated customer groups 60 with associated network links 70 in accordance with the various trading transactions conducted through the exchange 20.

The network building system 200 of the present invention is associated with the exchange 20 and facilitates the creation of ad hoc or extemporaneous communication networks comprised of various network links 70 interconnecting specified hubs 50. For example, a customer in the customer group 60 associated with the hub 50A may wish to purchase data carrying capacity between hub 50A and hub 50F. The customer functioning directly or indirectly as a buyer 30 in the exchange 20 likely has one or more criteria controlling this prospective purchase. For example, the customer may need data carrying capacity or network bandwidth during a specific range of dates, may require a specific quality of service (QoS), or may have specialized performance requirements particular to the type of data being transported. As evident in FIG. 1, there may be a substantial number of combinations of network links 70 and intervening hubs 50 that interconnect hubs 50A and 50F. This situation is further complicated because not all network links 70 and associated hubs 50 may satisfy the customer's needs regarding cost, performance, availability, etc.

Figure 2:
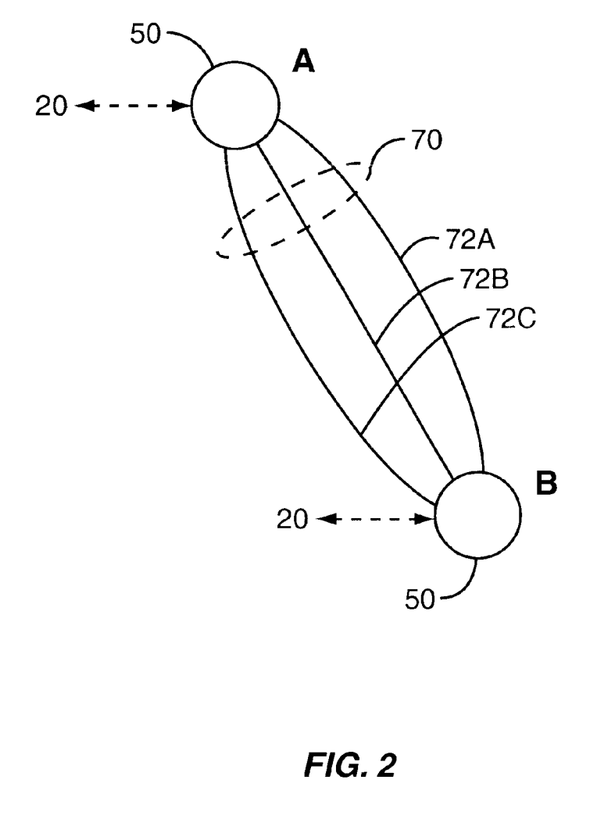
FIG. 2 illustrates the possible multiplicity of network segments interconnecting any two given hubs.

To better illustrate the potential number of choices involved in establishing a network path, possibly composed of various hubs 50 and network links 70, FIG. 2 provides more detail regarding the nature of the network links 70 that interconnect the various hubs 50. A given network link 70 between any two hubs 50 may actually include any number of network segments 72. Each network segment 72 may be associated with a different communications service provider functioning directly or indirectly as a seller 40 within the exchange 20. FIG. 2 illustrates an example wherein the network link 70 interconnecting hub 50A with hub 50B includes three parallel network segments 72A, 72B, and 72C.

A buyer 30 whose prospective purchase of communications services involving the network link 70 between hubs 50A and 50B has, in reality, three possible network segment choices, assuming the individual network segments 72A, 72B, and 72C are compatible with the buyer's criteria. Typically, the individual network segments 72 are parallel physical communication links between a given pair of hubs 50. However, the individual network segments 72 may logically exist as separate segments on a common physical carrier.

Figure 3:
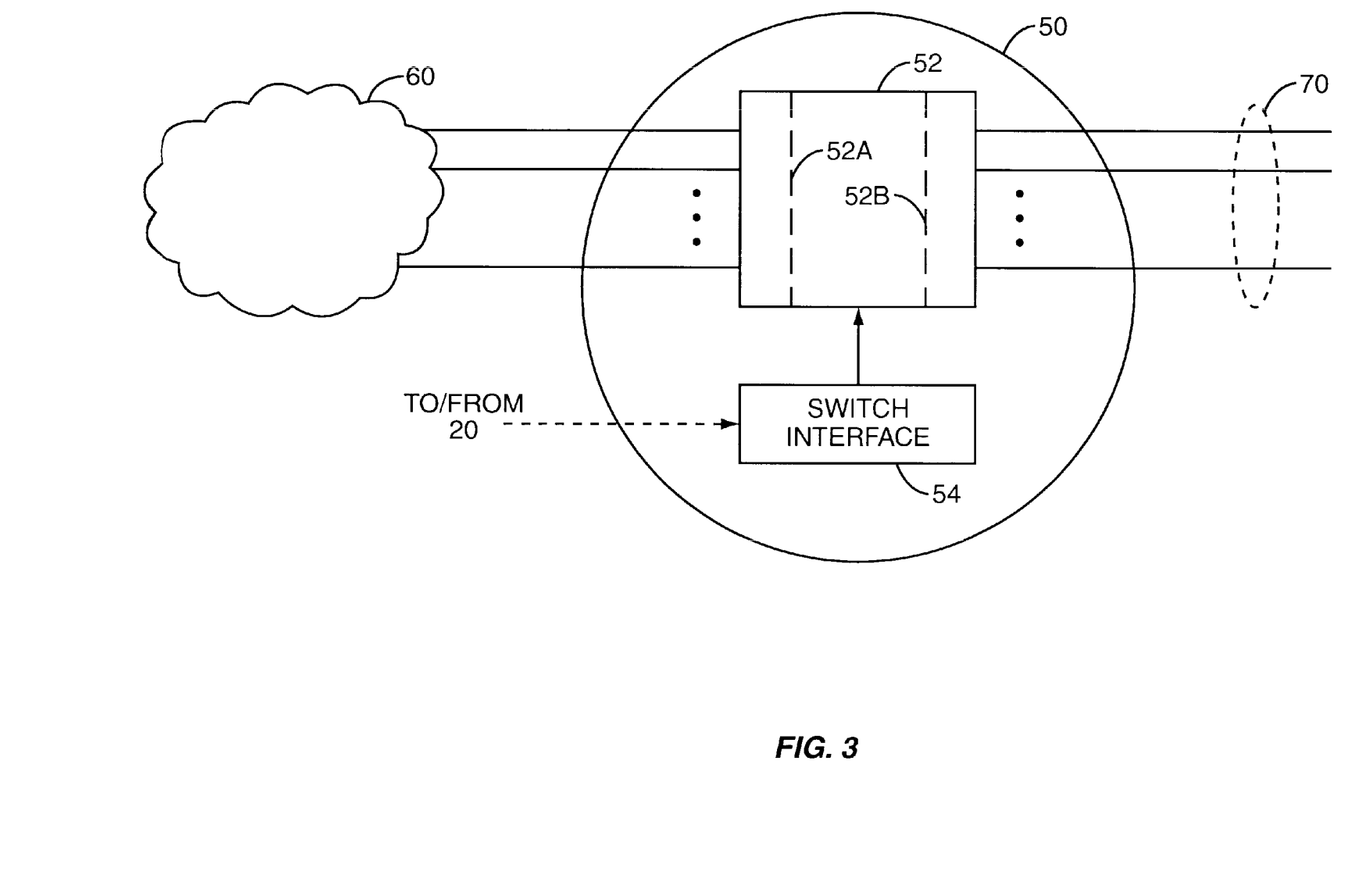
FIG. 3 illustrates an exemplary hub for use with a communications services bidding exchange.

FIG. 3 illustrates one embodiment for the hubs 50 used in association with the present invention. As earlier noted, the individual hubs 50 are responsive to transactions conducted in the exchange 20. More particularly, the hubs 50 provide selective interconnections between individual customers in the customer groups 60 and the network segments 72 that form the network links 70 interconnecting the various hubs 50. Each hub includes a switch 52 for selectively interconnecting communication lines connected to a first set of input/output (I/O) ports 52A with communication lines connected to a second set of I/O ports 52B. A switch interface 54 provides communications and control functions for the hub 50 and controls the switch 52 to configure it for a specific set of interconnections between I/O ports 52A and 52B in response to information received from the exchange 20. The exchange 20 may communicate with the switch interfaces 54 in the various hubs 50 either directly or indirectly. Indeed, the exchange 20 may interconnect with the hubs 50 via the network links 70, or via other types of communications connections.

Figure 4:
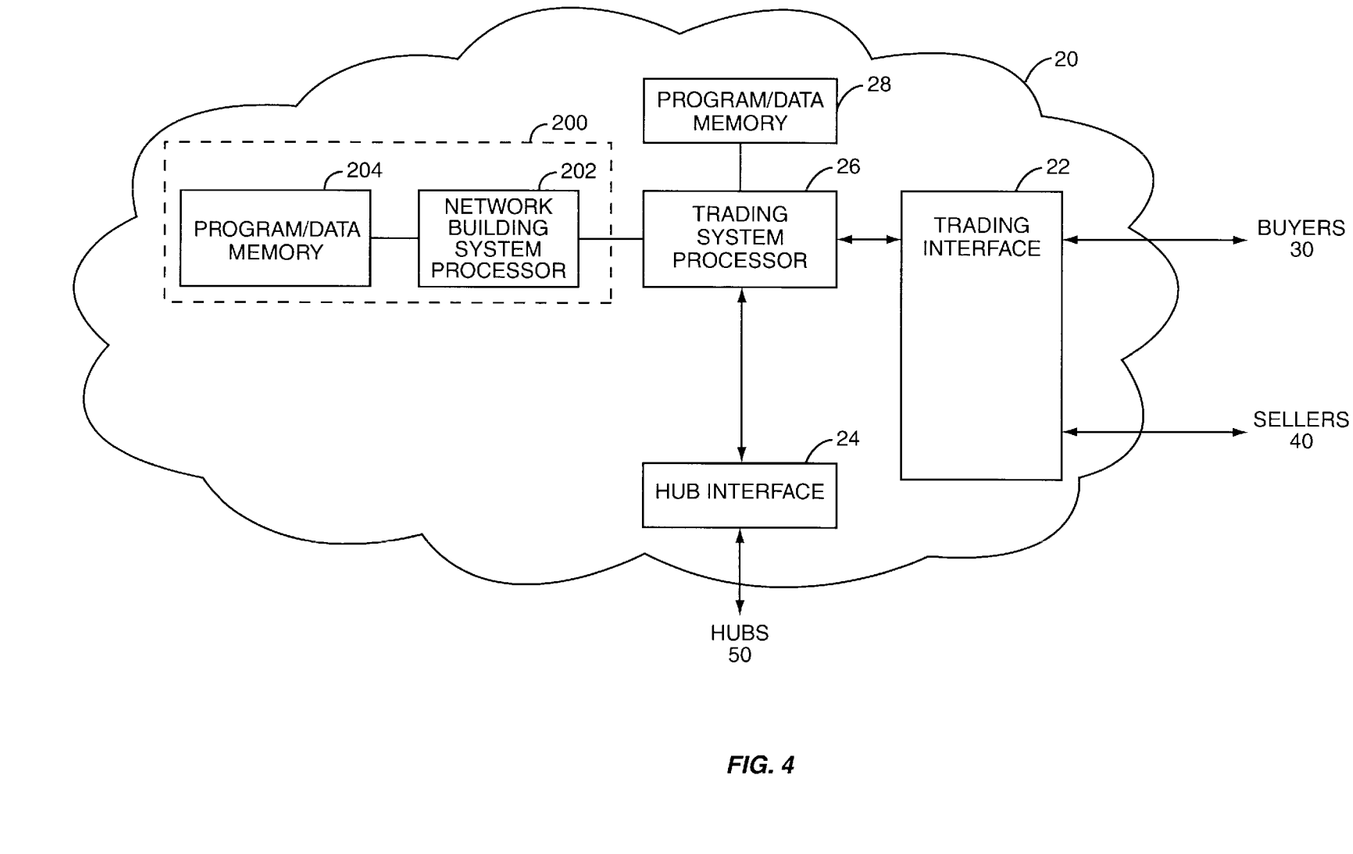
FIG. 4 illustrates an exemplary organization for a communications services bidding exchange that includes the network building system of the present invention.

FIG. 4 illustrates one embodiment of the exchange 20 and network building system 200 of the present invention. The exchange 20 includes a trading interface 22, a hub interface 24, a trading system processor 26 with associated program and data memory 28, and the network building system 200. The network building system includes, in at least some embodiments, a network building system processor 202 and associated program and data memory 204. Buyers 30 and sellers 40 communicate with the exchange 20 through the trading interface 22. The trading interface 22 may support interconnection with a variety of network types. For example, the trading interface 22 may be implemented as a web-based interface to the buyers 30 and sellers 40. In other embodiments, the trading interface 22 may operate as a proprietary, dial-up system, or may support various connection types to support the broad needs of buyers 30 and sellers 40.

The hub interface 24 interfaces the trading system processor 26 with the hubs 50. Note that the hubs 50 may connect with the hub interface 24 through a variety of network types. In at least one embodiment, the hubs 50 interconnect with the exchange 20 through available network links 70. However, in other embodiments the hubs 50 may have other types of connections with the exchange 20. In any case, the trading system processor 26 communicates with the hubs 50 through the hub interface 24 for a number of purposes. For example, the trading system processor 26 provides I/O port (52A and 52B) interconnection configuration information to the various hubs 50 based on buy and sell transactions conducted through the exchange 20. Further, the hubs 50 may, in some embodiments, provide the trading system processor 26 with QoS information, usage information, and other data related to monitoring and accounting for transactions conducted through the exchange 20. Such information is useful for verifying services delivered through the exchange 20 and for billing purposes.

The network building system 200 includes a network building system processor 202 and associated program and data memory 204. Preferably, the network building system processor 202 receives transaction requests and associated buyer criteria from the trading system processor 26. However, in some embodiments, the network building system processor 202 includes its own interface for buyers 30 and sellers 40. The program and data memory 204 includes program instructions supporting the ability of the network building system processor 202 to use buyer criteria in the selection of one or more network segments 72 in response to a request from a buyer 30 for data transport services through the exchange 20.

The utility of the present invention is better appreciated in contemplation of the many variables involved in selecting the particular combination (path) of network segments 72 appropriate for the communications service needs of a given buyer 30. Buyer information generally defines at least one service criteria, or at least allows the network building system 200 to determine one or more service criteria based on the buyer information. Typically such information includes at least a desired period of service, which allows the network building system 200 to select network segments 72 that are at least available during the requested period.

However, the present invention provides substantially more sophistication than simply reserving network segments 72 based on their availability during a desired period. For example, the network building system 200 may consider multiple criteria such as desired network redundancy, desired data type, desired connection locations (geographic points), desired data security, desired hub input/output interface, desired bandwidth or wavelength or capacity, desired network topology, desired type of data transport, desired cost, and preferred vendor (carrier) information. Numerous other buyer criteria may be included in or derived from the buyer information.

In general, the buyer information received by the network building system 200 describes a desired network service. Based on the buyer information, the network building system identifies one or more hubs 50 and one or more individual network segments 72 forming network paths for interconnecting those hubs. The identified hubs and network paths represent network resources capable of providing the desired network service. Because each hub 50 and the various network segments 72 interconnecting each hub 50 may have different characteristics, and data carrying capabilities, the network building system 200 must select an overall set of hubs 50 and interconnecting network segments 72 with service characteristics in alignment with the buyer information.

For example, the buyer information received by the network building system 200 may define a request for data multi-casting capability from New York to various other cities including Toronto, Los Angeles, and London. Based on this buyer information, the network building system selects a set of hubs 50 and network paths comprising one or more network segments 72 interconnecting the set of hubs 50 based on the city locations and multi-casting requirements. Numerous other examples illustrate some of the functionality of network building system 200. For example, the buyer information may define a request for data transport capacity allocation between Boston and Atlanta. Further, the specific capacity might be for wavelength allocation in a Dense Wavelength Division Multiplexing (DWDM) environment. In response to such buyer information, the network building system identifies the required hubs 50 and the specific network segments 72 suitable for fulfilling the buyer request. Note that the segments 72 identified in this example would be DWDM-based network segments 72.

Figure 5:
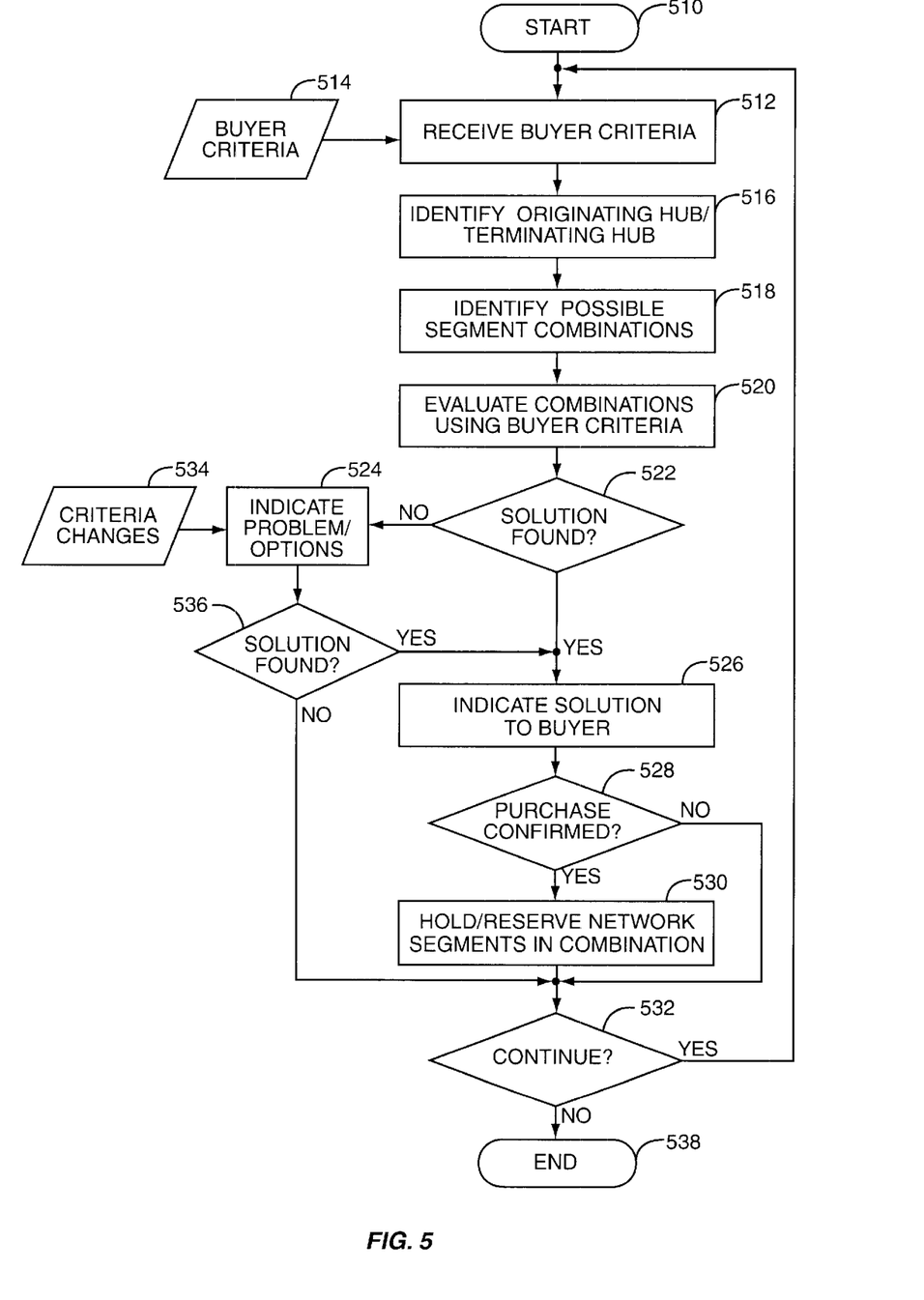
FIG. 5 illustrates exemplary flow logic for implementing network building functions in one embodiment of the present invention.

FIG. 5 illustrates exemplary flow logic for one embodiment of the network building system 200 of the present invention. Processing begins (block 510) with a network building system 200 receiving buyer criteria (block 512). Buyer criteria (block 514) may be provided directly to the network building system 200 by a buyer 30, or may be provided to the network building system by the exchange 20. In either case, the exchange 20 presents buyers 30 with an interface that allows buyers 30 and sellers 40 to monitor exchange conditions (such as market prices) and conduct buy and sell transactions. A set of hubs 50 are identified based on the buyer criteria (block 516). The buyer criteria may specify the set of hubs 50, or the network building system may identify the set of hubs 50, based on determining which of the affiliated plurality of hubs 50 best meet the buyer criteria.

For any set of two or more hubs 50 among the total plurality of hubs 50, there may be many possible combinations of network links 70 for interconnecting the hubs 50. Further, since each network link 70 may include any number of parallel network segments 72, the possible combinations of successive network segments 72 available for carrying data from one given hub 50 to another given hub 50 are significant. Thus, in one embodiment, the network building system 200 of the present invention first identifies possible combinations of network segments 72 that span the set of hubs 50 (block 518). This possible solution set may be reduced by eliminating network segments 72 that are unavailable during the time period needed by the buyer 30, or are unsuitable for the performance or operating needs of the buyer 30 (block 518). With preliminary combinations of network segments 72, processing continues with further evaluation of the possible combinations of network segments 72 using buyer criteria (block 520).

If a solution is found (block 522), it is indicated to the buyer 30 (block 526) and the buyer 30 is given the chance to confirm the purchase (block 528). The solution represents a combination of network segments 72, possibly from an array of different vendors, that form an extemporaneous network path interconnecting the set of hubs 50. If the purchase is confirmed (block 528), the specific combination of network segments 72 included in the buyer's purchase is reserved for the buyer's use during the requested time period (block 530). If the buyer 30 wishes to purchase additional communications services (block 532), processing continues with the network building system 200 receiving new buyer criteria (block 512), otherwise processing ends (block 538).

If no solution meeting the buyer's needs is available (block 522), this is indicated to the buyer 30 (block 524).

The network building system 200 can provide specific information about the reasons why a solution could not be found. Further, some embodiments of the network building system 200 provide the buyer with specific options for finding a workable solution (block 524). For example, a combination of network segments 72 having sufficient performance characteristics may be available when the buyer 30 requested them, however one or more of the network segments 72 may exceed the buyer's cost targets. In this case, the buyer 30 may simply agree to the higher prices and change their buying criteria (block 534). If a solution may be found in response to updated buyer criteria (block 536), processing continues with the solution being indicated to the buyer 30 (block 526) and subsequent processing continuing as described (blocks 528–532). If a solution cannot be found (block 536), processing continues with the buyer 30 being given the option to continue (block 532). If the buyer 30 chooses to continue, processing returns to a point where the network building system 200 receives new or updated buyer criteria (block 512). If the buyer does not wish to continue, processing ends (block 538).

Figure 6:
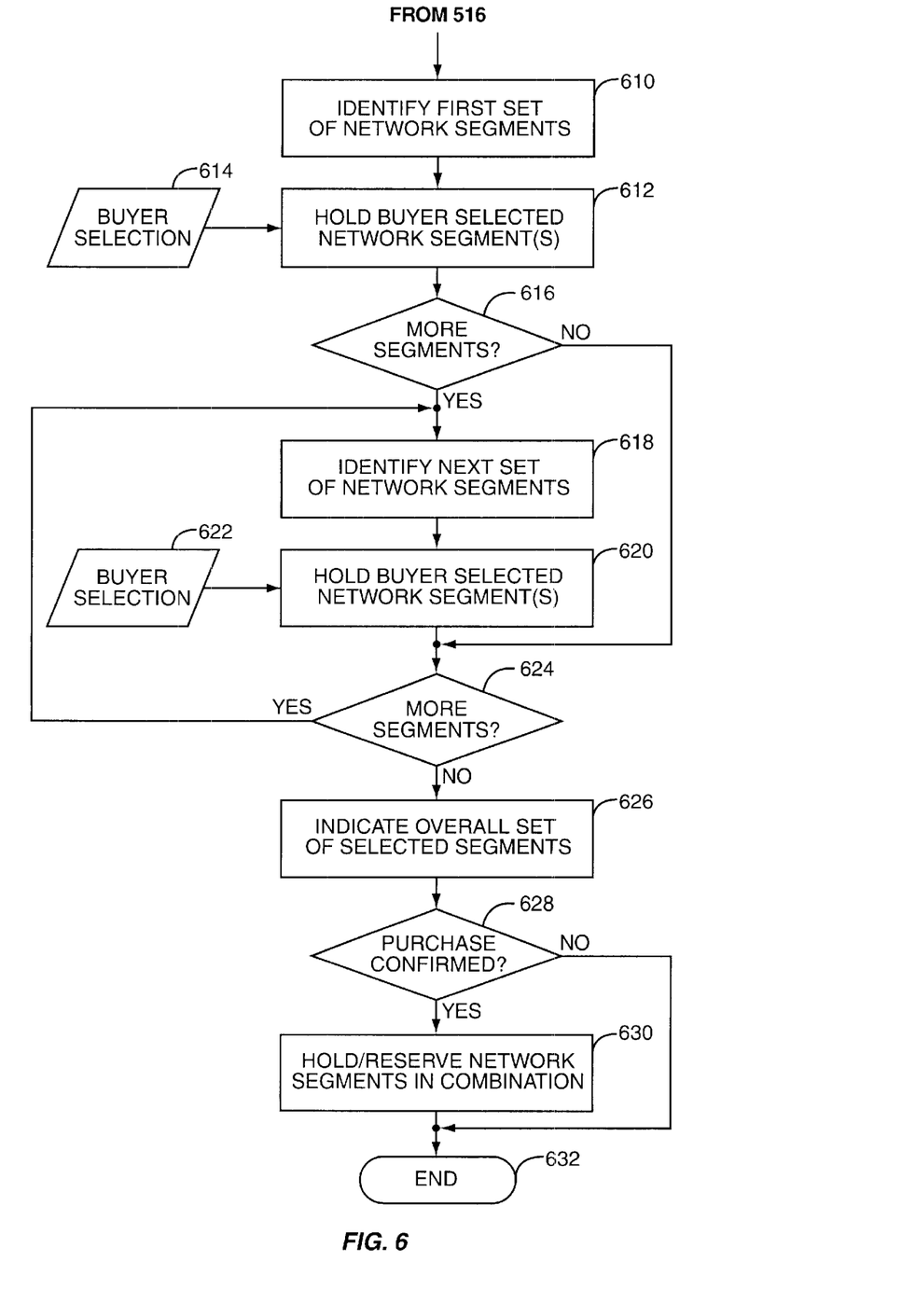
FIG. 6 illustrates exemplary flow logic for an alternate embodiment for implementing network building functions in one embodiment of the present invention.

FIG. 6 illustrates an alternate embodiment for a portion of the processing logic implemented in the network building system 200 of the present invention. The processing logic illustrated here supports manual selection of the network segments 72 combined to interconnect the set of hubs 50 corresponding to a given buyer's needs. Rather than the network building system 200 automatically selecting a complete set of combined network segments 72, the network building system 200 provides the buyer 30 with a set of network segments 72 that meet the buyer's criteria for each network link 70 interconnecting the set of hubs 50.

After the set of hubs 50 is identified (block 516), processing begins with the network building system 200 identifying the first set of network segments 72 that meet the buyer's criteria (block 610). The buyer 30 inputs selection information (block 614) and the network building system 200 temporarily holds the selected network segment 72 (block 612). The temporary hold denotes that the particular network segment 72 selected by the buyer 30 should not be allocated or reserved in other transactions being conducted in the exchange 20. The buyer may select some, or all, of the network segments 72 to interconnect the set of hubs 50 (and any intervening hubs 50 that are included between individual hubs 50 in the set of hubs 50). The network building system 200 allows the buyer to select only a portion of the network segments 72 comprising the network paths interconnecting the set of hubs 50. If there are more network segments 72 remaining (block 616), processing continues with the network building system 200 identifying the next set of network segments 72 (block 618). The buyer 30 again selects the next specific network segment 72 (block 622), which is, again, held in reserve during the network building process (block 620).

If more network segments are required (block 624), processing returns to identifying the next set of network segments 72 (block 618). If there are no more network segments 72 (block 624), the network building system 200 indicates the overall set of selected network segments 72 to the buyer 30 (block 626). If the buyer 30 confirms the purchase of the indicated solution (block 628), the network building system 200 reserves the network segments 72 included in the purchase so that the involved segments 72 will not be presented as available to other buyers 30 for the dates involved in the current purchase (block 630) and processing ends (block 632). If the purchase is not confirmed (block 628), processing ends (block 632) without the network segments 72 selected by the buyer 30 being reserved in the exchange 20.

Figure 7:
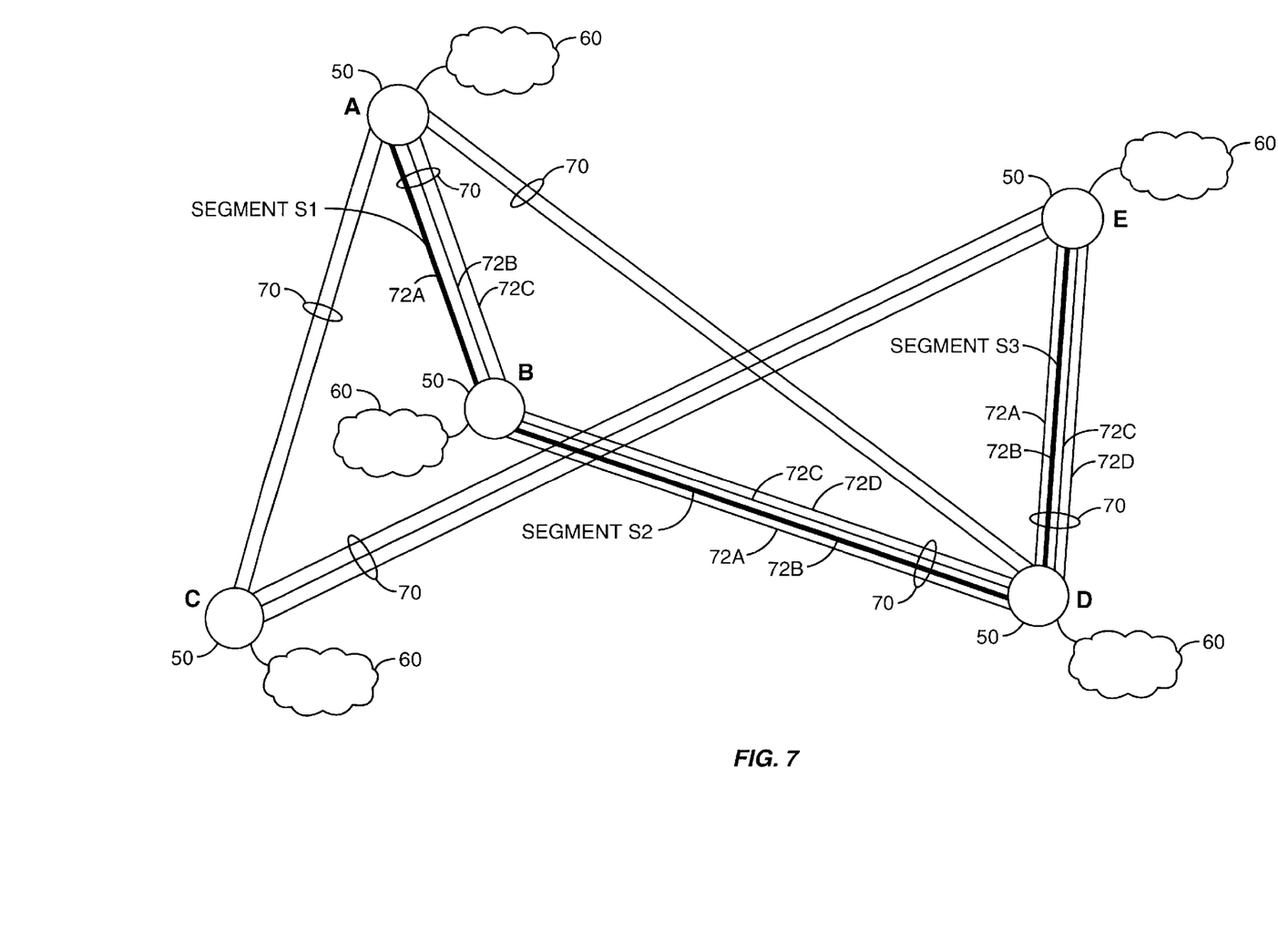
FIG. 7 illustrates an example of the network segment building process associated with the network building system of the present invention.

FIG. 7 provides a graphical depiction for a combination of network segments 72 forming a solution for a given buyer 30 operating in the exchange 20. In accordance with the foregoing discussion, the buyer 30 provides the exchange 20 with criteria identifying the buyer's particular network needs. In this instance, assume the buyer 30 wishes to purchase data carrying capacity between hubs 50A and 50E. As illustrated, the overall network link combinations include the following possible solutions: (1) hubs 50A→50C→50E; (2) hubs 50A→50D→50E; and (3) hubs 50A→50B→50D→50E. Further, each combination of network links includes a range of choices of network segments 72 within the particular combination of network links 70 to get to the next hub 50. Thus, the network building system 200 must select the best network segment 72 from each hub 50 involved in the extemporaneous network being identified for the buyer 30.

The exemplary solution illustrated shows a set of network segments {S1, S2, S3} interconnecting hub 50A with hub 50B. S1 represents network segment 72A between hubs 50A and 50B, S2 represents network segment 72B between hubs 50B and 50D, and S3 represents network segment 72A between hubs 50D and 50E. As earlier noted, the set of network segments {S1, S2, S3} may represent several different service providers associated with the exchange 20. Preferably, the exchange 20 allows the buyer 30 to conduct a single purchase transaction for the set of network segments {S1, S2, S3}, and reconciles billing and payments functions so that the buyer 30 does not deal with individual service providers.

As evident from the foregoing discussion and accompanying figures, the present invention allows substantial flexibility with regard to its operation and implementation. For example, the exchange 20 may be implemented as a single processing system that includes the functionality of the trading system processor 26 and the network building system processor 202 of the network building system 200. Further, the particular techniques used to provide communications between the exchange 20 and the hubs 50, buyers 30, and sellers 40, determines the particular configuration of the trading and hub interfaces 22 and 24, respectively. Indeed, the particular structure and implementation of the exchange 20 is not critical to practicing the present invention.

Other opportunities for varying the present invention exist with regard to the network building process itself. For example, during the manual network building process discussed above, there are various ways of presenting the buyer 30 with the range of choices available for each network segment selection involved in building the combination of network segments involved in the solution for that particular buyer. Thus, the exchange 20 may provide the buyer with a pick list of network segments 72 meeting the buyer's criteria from which the buyer may select a specific network segment 72. The network building system 200 might order this pick list in accordance with secondary considerations, such as preferred service providers, etc.

Thus, the foregoing discussion and accompanying illustrations are exemplary and should not be construed as limiting the present invention. Indeed, the present invention is limited only by the scope of the appended claims, and the reasonable equivalents thereof.

What is claimed is:

1. A method of facilitating selection of communications services in a communications service bidding exchange affiliated with a plurality of hubs interconnected via network segments and adapted to selectively route communications traffic in accordance with bidding exchange transactions, the method comprising:

receiving buyer information associated with a potential buyer and bearing on a desired network service;

determining a set of hubs from the plurality of hubs and a plurality of network paths for interconnecting the set of hubs in accordance with the buyer information, wherein each potential network path comprises at least one said network segment; and identifying at least one preferred network path from the plurality of potential network paths for interconnecting the set of hubs based at least in part on the buyer information;

wherein identifying comprises providing information supporting selection of at least one individual network segment to form at least part of the preferred network path, such that the potential buyer can select the at least one individual network segment;

receiving selection information for the at least one individual network segment; and forming the preferred network path based at least in party on the at least one individual network segment;

wherein the information supporting selection of the at least one individual network segment allows the potential buyer to interactively select at least a portion of the preferred network path; and wherein the set of hubs and the at least one preferred network pat identified are capable of providing the desired network service.

2. The method of claim 1 further comprising:

providing proposal information based on the set of hubs and the at least one preferred network path identified to provide the desired network service;

receiving confirmation of the proposal information; and reserving sufficient resources to provide the desired network service on the set of hubs and the at least one preferred network path upon receipt of the confirmation.

3. The method of claim 1 wherein the buyer information defines at least the desired network service, and further wherein the step of determining comprises:

identifying particular ones of the plurality of hubs as the set of hubs based at least in part on the desired network service; and identifying particular ones of the network segments for potentially interconnecting the particular ones of the plurality of hubs in the set of hubs based at least in part on the desired network service.

4. The method of claim 1 wherein the buyer information defines at least one parameter in a set of parameters consisting of desired service cost, desired network topology, desired set of geographic points, desired period of use, desired minimum quality of service, desired data-type optimization, desired data capacity, desired network bandwidth, desired optical wavelength allocation, desired level of data security, desired network redundancy, a desired hub input/output interface, desired vendors, and desired communications network transmission protocol, and further wherein the steps of determining and identifying are based at least in part on the at least one parameter defined in the buyer information.

5. The method of claim 1 wherein the buyer information defines at least a desired network topology and desired connection locations, and further wherein the step of determining comprises determining the set of hubs and the plurality of potential network paths based on the desired connection locations and the desired network topology.

6. The method of claim 1 wherein the buyer information further defines at least a desired period of use and further wherein the steps of determining and identifying comprise determining the set of hubs and identifying the at least one preferred network path based at least in part on comparing usage availability information associated with at least some of the plurality of hubs and at least some of the plurality of potential network paths with the desired period of use.

7. A method of facilitating selection of communications services in a communications service bidding exchange affiliated with a plurality of hubs interconnected via network segments and adapted to selectively route communications traffic in accordance with bidding exchange transactions, the method comprising:

receiving buyer Information associated with a potential buyer and bearing on a desired network service;

determining a set of hubs from the plurality of hubs and a plurality of network paths for interconnecting the set of hubs in accordance with the buyer information, wherein each potential network path comprises at least one said network segment;

identify at least one preferred network path from the plurality of potential network paths for interconnecting the set of hubs based at least in part on the buyer information; and providing information supporting a graphical depiction of at least the set of hubs and at least a portion of the plurality of potential network paths, such that the potential buyer has an opportunity to see a visual depiction of the set of hubs and at least some of the potential interconnections between the set of hubs associated with the plurality of potential network paths, wherein the set of hubs and the at least one preferred network path identified are capable of providing the desired network service.

8. The method of claim 7 further comprising providing additional information for visually distinguishing the at least one preferred network path in the graphical depiction.

9. The method of claim 7 wherein the step of identifying comprises:

providing information supporting selection of at least one individual network segment to form at least part of the preferred network path, such that the potential buyer can select the at least one individual network segment;

receiving selection information for the at least one individual network segment; and forming the preferred network path based at least in party on the at least one individual network segment;

wherein the information supporting selection of the at least one individual network segment allows the potential buyer to interactively select at least a portion of the preferred network path.

10. The method of claim 9 wherein the information supporting selection of the at least one network segment includes information supporting a graphical depiction of the set of hubs and the plurality of potential network paths, and further comprising providing additional information for visually distinguishing particular ones of the individual network segments within the potential network paths in accordance with the selection information received.

11. The method of claim 9 further comprising temporarily reserving the at least one network segment in accordance with the selection information while the potential buyer is interactively selecting the at least a portion of the preferred network path.

12. The method of claim 11 further comprising confirming reservation of the preferred network path upon receiving a service purchase confirmation from the potential buyer.

13. The method of claim 9 wherein the information supporting the selection of the at least one individual network segment comprises pick list information for at least one parameter relevant to the buyer information, thereby enabling the potential buyer to make a selection from the pick list.

14. The method of claim 1 further comprising providing summary information for at least one service parameter relevant to the buyer information for the set of hubs and the preferred network path, such that the potential buyer can evaluate fulfillment of at least one requirement set forth by the buyer information in advance of confirming a service purchase involving the set of hubs and the preferred network path.

15. The method of claim 1 wherein the buyer information indicates a type of data intended for transport between the set of hubs, and further wherein the step of determining comprises determining the set of hubs and those potential network paths interconnecting the set of hubs that are best suited for the type of data.

16. A method of facilitating selection of communications services in a communications service bidding exchange affiliated with a plurality of hubs interconnected via network segments and adopted to selectively route communications traffic in accordance with bidding exchange transactions, the method comprising:
receiving buyer information associated with a potential buyer and bearing on a desired network service;
determining a set of hubs from the plurality of hubs and a plurality of network paths for interconnecting the set of hubs in accordance with the buyer information, wherein each potential network path comprises at least one said network segment;
identifying at least one preferred network path from the plurality of potential network paths for interconnecting the set of hubs based at least in part on the buyer information; and
wherein the set of hubs and the at least one preferred network path identified are capable of providing the desired network service;
wherein the buyer information indicates a desired connection topology between the set of hubs, and further wherein the step of determining comprises determining those potential network paths interconnecting the set of hubs with the desired connection topology.

17. A computer readable media comprising software for facilitating selection of communications services in a communications service bidding exchange affiliated with a plurality of hubs interconnected via network segments and adopted to selectively route communications traffic in accordance with bidding exchange transactions, based on instructing a computer system to:
receive buyer information associated with a potential buyer and bearing on a desired network service;
determine a set of hubs from the plurality of hubs and a plurality of potential network paths for interconnecting the set of hubs in accordance with the buyer information, wherein each potential network path comprises at least one said network segment; and
identity at least one preferred network path from the plurality of potential network paths for interconnecting the set of hubs based at least in part on the buyer information;
wherein the instruction to identify comprises instructions to:
provide information supporting selection of at least one individual network segment to form at least at of the preferred network path, such that the potential buyer can select the at least one individual network segment;
receive selection information for the at least one individual network segment; and
form the preferred network path based at least in part on the at least one individual network segment;
wherein the information supporting selection of the at least one individual network segment allows the potential buyer to interactively select at least a portion of the preferred network path;
wherein the set of hubs and the at least one preferred network path identified are capable of providing the desired network service.

18. The computer readable media comprising software of claim 17 for further instructing the computer system to:
provide proposal information based on the set of hubs and the at least one preferred network path identified to provide the desired network service;
receive confirmation of the proposal information; and
reserve sufficient resources to provide the desired network service on the set of hubs and the at least one preferred network path upon receipt of the confirmation.

19. The computer readable media comprising software of claim 17 for further instructing the computer system to:
identify particular ones of the plurality of hubs as the set of hubs based at least in part on the desired network service; and
identify particular ones of the network segments for potentially interconnecting the particular ones of the plurality of hubs in the set of hubs based at least in part on the desired network service.

20. The computer readable media comprising software of claim 17 wherein the buyer information defines at least one parameter in a set of parameters consisting of desired service cost, desired network topology, desired set of geographic points, desired period of use, desired minimum quality of service, desired data-type optimization, desired data capacity, desired network bandwidth, desired optical wavelength allocation, desired level of data security, desired network redundancy, a desired hub input/output interface, desired vendors, and desired communications network transmission protocol, and further wherein the instructions to determine and identify are based at least in part on the at least one parameter defined in the buyer information.

21. The computer readable media comprising software of claim 17 wherein the buyer information defines at least a desired network topology and desired connection locations, and further wherein the instruction to determine comprises instructions to determine the set of hubs and the plurality of potential network paths based on the desired connection locations and the desired network topology.

22. The computer readable media comprising software of claim 17 wherein the buyer information further defines at least a desired period of use and further wherein the instructions to determine the set of hubs and identify the at least one preferred network path based at least in part on comparing usage availability information associated with at least some of the plurality of hubs and at least some of the plurality of potential network paths with the desired period of use.

23. A computer readable media comprising software for facilitating selection of communications services in a communications service bidding exchange affiliated with a plurality of hubs interconnected via network segments and adapted to selectively route communications traffic in accordance with bidding exchange transactions, based on instructing a computer system to:

receive buyer information associated with a potential buyer and bearing on a desired network service;

determine a set of hubs from the plurality of hubs and a plurality of potential network paths for interconnecting the set of hubs in accordance with the buyer information, wherein each potential network path comprises at least one said network segment;

identify at least one preferred network path from the plurality of potential network paths for interconnecting the set of hubs based at least in part on the buyer information; and provide information supporting a graphical depiction of at least the set of hubs and at least a portion of the plurality of potential network paths, such that the potential buyer has an opportunity to see a visual depiction of the set of hubs and at lest some of the potential interconnections between the set of hubs associated with the plurality of potential network paths;

wherein the set of hubs and the at least one preferred network path identified are capable of providing the desired network service.

24. The computer readable media comprising software of claim 17 for further instructing the computer system to provide additional information for visually distinguishing the at least one preferred network path in the graphical depiction.

25. The computer readable media comprising software of claim 17 wherein the information supporting selection of the at least one network segment includes information supporting a graphical depiction of the set of hubs and the plurality of potential network paths, and for further instructing the computer system to provide additional information for visually distinguishing particular ones of the individual network segments within the potential network paths in accordance with the selection information received.

26. The computer readable media comprising software of claim 17 for further instructing the computer system to temporarily reserve the at least one network segment in accordance with the selection information while the potential buyer is interactively selecting the at least a portion of the preferred network path.

27. The computer readable media comprising software of claim 26 for further instructing the computer system to confirm reservation of the preferred network path upon receiving a service purchase confirmation from the potential buyer.

28. The computer readable media comprising software of claim 17 wherein the information supporting the selection of the at least one individual network segment comprises pick list information for at least one parameter relevant to the buyer information, thereby enabling the potential buyer to make a selection from the pick list.

29. The computer readable media comprising software of claim 17 for further instructing the computer system to provide summary information for at least one service parameter relevant to the buyer information for the set of hubs and the preferred network path, such that the potential buyer can evaluate fulfillment of at least one requirement set forth by the buyer information in advance of confirming a service purchase involving the set of hubs and the preferred network path.

30. The computer readable media comprising software of claim 17 wherein the buyer information indicates a type of data intended for transport between the set of hubs, and further wherein the instruction to determine comprises instructions to determine the set of hubs and those potential network paths interconnecting the set of hubs that are best suited for the type of data.

31. The computer readable media comprising software of claim 17 wherein the buyer information indicates a desired connection topology between the set of hubs, and further wherein the instruction to determine comprises instructions to determine those potential network paths interconnecting the set of hubs with the desired connection topology.

32. A system for facilitating selection communications services in a communications service bidding exchange affiliated with a plurality of hubs interconnected via network segments and adapted to selectively route communications traffic in accordance with bidding exchange transactions, the system comprising:

a first communications interface adapted to receive buyer information associated with a potential buyer and bearing on a desired network service; and a controller adapted to determine a set of hubs from the plurality of hubs and a plurality of potential network paths for interconnecting the set of hubs in accordance with the buyer information, wherein each potential network path comprises at least one said network segment;

said controller further adapted to identify at least one preferred network path from the plurality of potential network paths for interconnecting the set of hubs based at least in part on the buyer information, wherein the set of hubs and the at least one preferred network path identified are capable of providing the desired network service;

said controller adapted to identify the preferred network path base don adaptations to:

provide information supporting selection of at least one individual network segment to form at least part of the preferred network path via the first communications interface, such that the potential buyer can select the at least one individual network segment;

receive selection information for the at least one individual network segment via the first communications interface; and form the preferred network path based at least in part on the at least one individual network segment;

wherein the information supporting selection of the at least one individual network segment allows the potential buyer to select at least a portion of the preferred network path.

33. The system of claim 32 wherein the controller is further adapted to:

provide proposal information via the first communications interface based on the set of hubs and the at least one preferred network path identified to provide the desired network service;

receive confirmation of the proposal information via the first communications interface; and reserve sufficient resources to provide the desired network service on the set of hubs and the at least one preferred network path upon receipt of the confirmation.

34. The system of claim 33 further comprising a second communications interface, wherein the controller is further adapted to communicate reservation information via the second communications interface to the set of hubs in support of reserving the sufficient resources to provide the desired network service.

35. The system of claim 34 wherein the controller is further adapted to communicate additional reservation information via the second communications interface to at least one network vendor affiliated with the network segments in the preferred network path in support of reserving the sufficient resources to support provide the desired network service.

36. The system of claim 32 wherein the buyer information defines at least the desired network service, and further wherein the controller is further adapted to:
   identify particular ones of the plurality of hubs as the set of hubs based at least in part on the desired network service; and identify particular ones of the network segments for potentially interconnecting the particular ones of the plurality of hubs in the set of hubs based at least in part on the desired network service.

37. The system of claim 32 wherein the buyer information defines at least a desired network topology and desired connection locations, and further wherein the controller is adapted to determine the set of hubs and the plurality of potential network paths based on the desired connection locations and the desired network topology.

38. The system of claim 32 wherein the controller is further adapted to provide information via the first communications interface supporting a graphical depiction of at least the set of hubs and at least a portion of the plurality of potential network paths, such that the potential buyer has an opportunity to see a visual depiction of the set of hubs and at least some of the potential interconnections between the set of hubs associated with the plurality of potential network paths.

39. The system of claim 38 wherein the controller is further adapted to provide additional information for visually distinguishing the at least one preferred network path in the graphical depiction.

* * * * *